Figure 1:
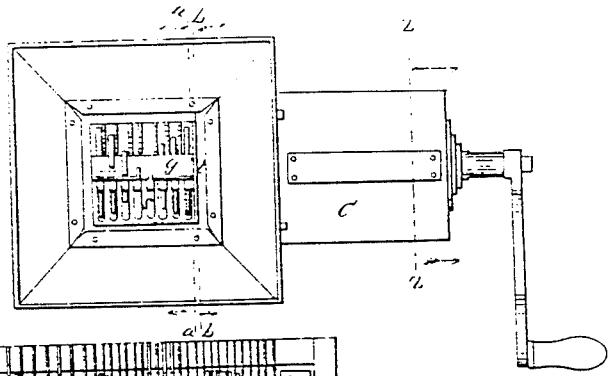
Figure 2:
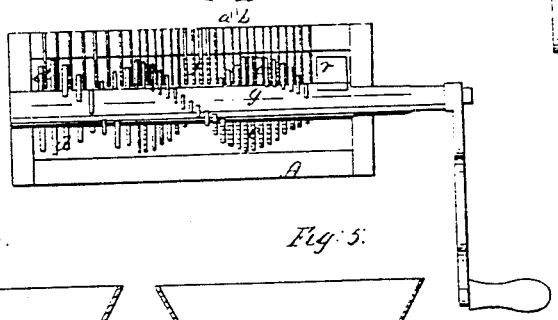
Figure 4:
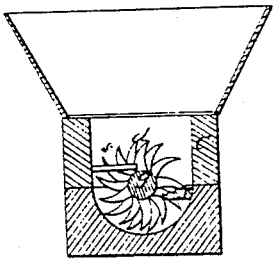
Figure 5:
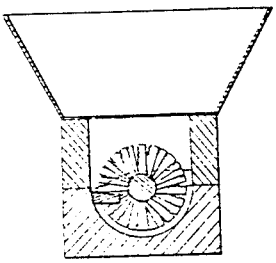
Figure 6:
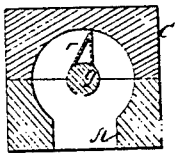
Figure 3:
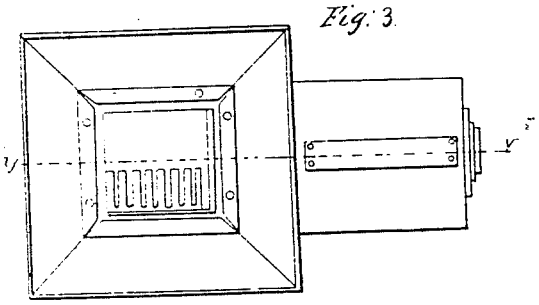
Figure 7:
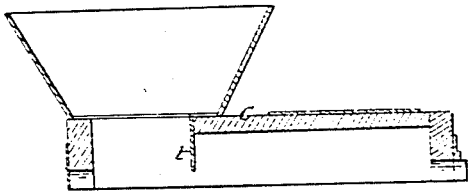

B. Moderley

BEST AVAILABLE COPY

Cider Mill.

No 187. A.I. Patented Jan. 19. 1850

N. PETERS, PHOTO-LITHOGRAPHER, WASHINGTON, D. C.